(12) United States Patent
Fukayama et al.

(10) Patent No.: US 11,338,784 B2
(45) Date of Patent: May 24, 2022

(54) ELECTRIC BOOSTER

(71) Applicant: HITACHI AUTOMOTIVE SYSTEMS, LTD., Ibaraki (JP)

(72) Inventors: Norihisa Fukayama, Yokohama (JP); Hidekazu Tsuchiya, Atsugi (JP); Shinji Shimizu, Atsugi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 122 days.

(21) Appl. No.: 16/485,907

(22) PCT Filed: Feb. 15, 2018

(86) PCT No.: PCT/JP2018/005154
§ 371 (c)(1),
(2) Date: Aug. 14, 2019

(87) PCT Pub. No.: WO2018/155286
PCT Pub. Date: Aug. 30, 2018

(65) Prior Publication Data
US 2020/0023828 A1 Jan. 23, 2020

(30) Foreign Application Priority Data

Feb. 23, 2017 (JP) .............................. JP032142/2017
Jul. 26, 2017 (JP) .............................. JP144847/2017

(51) Int. Cl.
*B60T 13/74* (2006.01)
*B60T 13/68* (2006.01)
(Continued)

(52) U.S. Cl.
CPC .......... *B60T 13/686* (2013.01); *B60T 8/4081* (2013.01); *B60T 13/148* (2013.01); *B60T 13/745* (2013.01)

(58) Field of Classification Search
CPC .... B60T 13/745; B60T 2220/04; B60T 7/042; G01D 5/142
See application file for complete search history.

(56) References Cited

U.S. PATENT DOCUMENTS 5,853,231 A * 12/1998 Iwamura ............. F15B 13/0842
303/119.2
6,799,813 B2 * 10/2004 Staltmeir ............. B60T 8/3675
303/119.3

(Continued)

FOREIGN PATENT DOCUMENTS

DE 102015104246 A1 * 9/2016 ............ B60T 13/686
JP 2015-098289 5/2015

OTHER PUBLICATIONS

International Search Report dated May 1, 2018 in International (PCT) Application No. PCT/JP2018/005154 with English translation.

(Continued)

*Primary Examiner* — Bradley T King
(74) *Attorney, Agent, or Firm* — Wenderoth, Lind & Ponack, L.L.P.

(57) ABSTRACT

An electronic booster includes an electric motor configured to thrust a piston in a master cylinder, a stroke detection device configured to detect a movement amount of an input member connected to a brake pedal, a rotational angle detection portion configured to detect a rotational angle of a rotational shaft of the electric motor, a control device configured to control driving of the electric motor, and a casing containing a wiring electrically connecting the electric motor and the control device to each other. The stroke detection device includes a first magnet configured to move together with the input member and a first magnetism detection element configured to detect magnetism from the first magnet. The rotational angle detection portion includes (Continued)

a second magnet configured to move together with the rotational shaft of the electric motor and a second magnetism detection element configured to detect magnetism from the second magnet.

10 Claims, 7 Drawing Sheets

(51) Int. Cl.
  *B60T 8/40* (2006.01)
  *B60T 13/14* (2006.01)

(56) References Cited

U.S. PATENT DOCUMENTS

| | | | |
|---|---|---|---|
| 2008/0302100 A1* | 12/2008 | Ohtani | B60T 13/745 60/545 |
| 2011/0115282 A1* | 5/2011 | Dinkel | B60T 7/042 303/3 |
| 2011/0138802 A1* | 6/2011 | Sakuma | B60T 13/745 60/545 |
| 2011/0259005 A1* | 10/2011 | Kikuchi | B60T 13/662 60/545 |
| 2012/0073286 A1* | 3/2012 | Takayama | B60T 13/745 60/538 |
| 2015/0070003 A1* | 3/2015 | Elliott | B60T 8/368 324/207.15 |
| 2016/0016567 A1* | 1/2016 | Jurgens | B60T 8/4086 303/10 |
| 2016/0107628 A1* | 4/2016 | Mahnkopf | B60T 13/575 303/115.2 |
| 2016/0251009 A1* | 9/2016 | Willmann | B60T 13/745 60/533 |
| 2016/0264114 A1 | 9/2016 | Maruo et al. | |
| 2017/0282880 A1* | 10/2017 | Nakamura | B60T 11/165 |
| 2018/0009425 A1* | 1/2018 | Feigel | B60T 8/368 |
| 2018/0065605 A1* | 3/2018 | Leiber | B60T 7/042 |
| 2018/0162330 A1* | 6/2018 | Odaira | B60T 13/745 |
| 2019/0232928 A1* | 8/2019 | Adachi | B60T 11/18 |

OTHER PUBLICATIONS

Written Opinion of the International Searching Authority dated May 1, 2018 in International (PCT) Application No. PCT/JP2018/005154 with English translation.

\* cited by examiner

ELECTRIC BOOSTER

TECHNICAL FIELD

The present invention relates to an electric booster built in a brake apparatus of a vehicle such as an automobile and configured to generate a brake hydraulic pressure in a master cylinder with use of an electric motor.

BACKGROUND ART

Conventionally, an electric booster has been equipped with a stroke detection device configured to detect a movement amount (a stroke amount) of an input member (a push rod) according to an operation on a brake pedal (refer to. PTL 1). This stroke detection device includes a stroke sensor including a Hall element disposed therein. The Hall element detects magnetism from a permanent magnet stroked according to a predetermined correlation with the pedal stroke amount of the brake pedal.

CITATION LIST

Patent Literature

[PTL 1] Japanese Patent Application Public Disclosure No. 2015-98289

SUMMARY OF INVENTION

Technical Problem

In the case where the stroke detection device discussed in PTL 1 is employed for the electric booster, this employment leads to an increase in a size of the electric booster because the above-described stroke sensor is disposed alone outside the master cylinder. Further, this configuration may raise such a problem that mountability of the electric booster onto the vehicle is deteriorated along with the increase in the size.

Therefore, the present invention has been made with the object of providing an electric booster configured to be able to improve the vehicle mountability without increasing the size thereof.

Solution to Problem

To achieve the above-described object, according to one aspect of the present invention, an electronic booster includes an electric motor configured to thrust a piston in a master cylinder, a stroke detection device configured to detect a movement amount of an input member connected to a brake pedal, a rotational angle detection portion configured to detect a rotational angle of a rotational shaft of the electric motor, a control device configured to control driving of the electric motor based on results of the detection by the stroke detection device and the rotational angle detection portion, and a casing containing a wiring electrically connecting the electric motor and the control device to each other. The stroke detection device includes a first magnet configured to move together with the input member and a first magnetism detection element configured to detect magnetism from this first magnet. The rotational angle detection portion includes a second magnet configured to move together with the rotational shaft of the electric motor and a second magnetism detection element configured to detect magnetism from this second magnet. The first magnetism detection element and the second magnetism detection element are disposed inside the casing.

According to the one aspect of the present invention, the electric booster can improve the vehicle mountability without increasing the size thereof.

DESCRIPTION OF EMBODIMENTS

In the following description, embodiments of the present invention will be described in detail with reference to FIGS. 1 to 7.

In the following description, an electric booster 1 according to one of the embodiments of the present invention will be described, and this description will be given assuming that a left side and a right side in FIGS. 4 and 5 correspond to a front side (a front side of a vehicle) and a rear side (a rear side of the vehicle), respectively. Further, in FIG. 2, a mounting plate 27, a second compression coil spring 126, and a second casing cover 208 are omitted from the illustration to facilitate better understanding of the following description.

Figure 4:
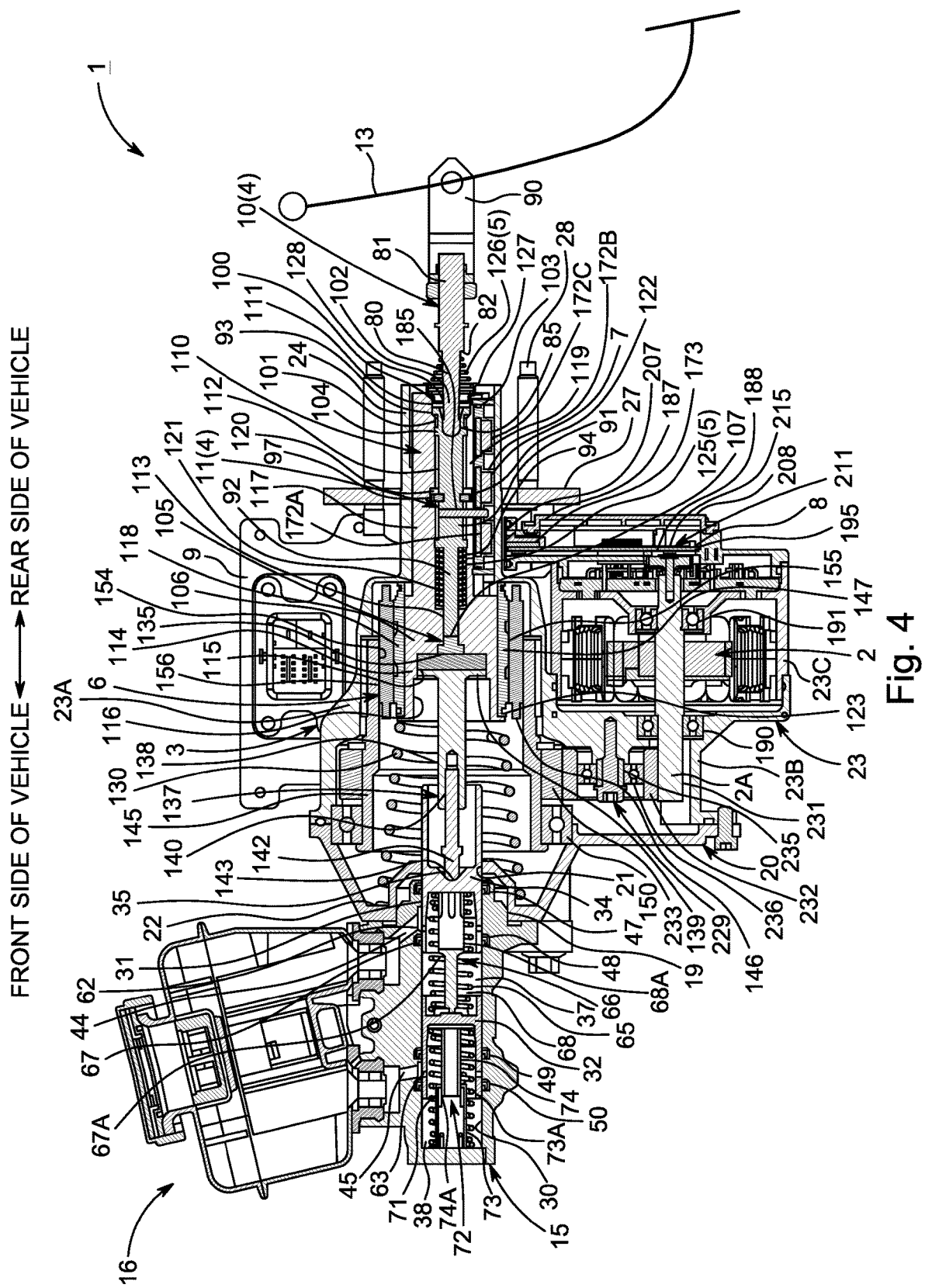
FIG. 4 is a cross-sectional view taken along a line A-A illustrated in FIG. 3.

As illustrated in FIG. 4, the electric booster 1 according to the present embodiment generally includes an electric motor 2, a housing 3, an input member 4, a resistive force application mechanism 5, a rotation-linear motion conversion mechanism 6, a stroke detection device 7, a rotational angle detection portion 8, and a controller 9.

The electric motor 2 is provided in a rear housing 23 of the housing 3, and, more specifically, inside a motor housing portion 23C. The input member 4 includes an input rod 10 and an input plunger 11, and reciprocates on the same axis with a master cylinder 15. The input rod 10 is coupled with a brake pedal 13, and extends toward the master cylinder 15 in the housing 3. The input plunger 11 is coupled with a front end (a ball joint portion 85) of this input rod 10, and a part of a reaction force is transmitted from a primary piston 31 and a secondary piston 32 in the master cylinder 15 to the input plunger 11.

The resistive force application mechanism 5 functions to generate such a hysteresis characteristic that a different resistive force (the reaction force) is applied to the input member 4 between when the input member 4 (the input rod 10 and the plunger 11) moves forward and when the input member 4 moves backward (between when the brake pedal 13 is pressed and when the brake pedal 13 is returned). The rotation-linear motion conversion mechanism 6 functions to assist a thrust force to the primary piston 31 and the secondary piston 32 in the master cylinder 15 due to actuation of the electric motor 2 according to the forward movement of the input rod 10 following an operation on the brake pedal 13. The stroke detection device 7 functions to detect a movement amount (a stroke amount) of the input member 4 (the input rod 10 and the input plunger 11) relative to the housing 3 based on the operation amount on the brake pedal 13. The rotational angle detection portion 8 functions to detect a rotational angle of a rotational shaft 2A of the electric motor 2. The controller 9 functions to control driving of the electric motor 2 so as to generate a brake hydraulic pressure in each of a primary chamber 37 and a secondary chamber 38 in the master cylinder 15 at a predetermined boosting ratio by adjusting a relative position between the input member 4 and a thrust member 110 based on detection signals from various kinds of sensors such as the stroke detection device 7 and the rotational angle detection portion 8.

In the following description, the present electric booster 1 will be described in detail.

As illustrated in FIGS. 1 to 4, the present electric booster 1 is structured in such a manner that the tandem-type master cylinder 15 is coupled with a front side of the housing 3. A reservoir 16 is attached on a top of the master cylinder 15. The reservoir 16 supplies brake fluid to the master cylinder 15. The housing 3 includes the rear housing 23 and a front housing 20. The front housing 20 closes an opening on a front end of this rear housing 23 (an opening on a right end in FIG. 4).

An opening portion 21 is formed on the front housing 20. The primary piston 31 extending from the master cylinder 15 is inserted through the opening portion 21. The rear housing 23 contains the rotation-linear motion conversion mechanism 6, the electric motor 2, and the like, and includes a cylindrical portion 24. The rear housing 23 includes a first rear housing portion 23A, a second rear housing portion 23B, and the motor housing portion 23C. The first rear housing portion 23A contains the rotation-linear motion conversion mechanism 6. The second rear housing portion 23B contains an intermediate gear 232 of a transmission member 229 that transmits a rotation from the electric motor 2 to the rotation-linear motion conversion mechanism 6. The motor housing portion 23C is fixed to the second rear housing portion 23B, and contains the electric motor 2. The cylindrical portion 24 is provided so as to extend integrally from a rear portion of the first rear housing portion 23A. This cylindrical portion 24 is concentric with the master cylinder 15, and is integrally provided in a manner protruding in a direction away from the master cylinder 15 (rearward). The mounting plate 27 is fixed around the cylindrical portion 24 of the first rear housing portion 23A. A plurality of stud bolts 28 is attached to this mounting plate 27 so as to penetrate therethrough. Then, the present electric booster 1 is fixed to a dash panel with use of the plurality of stud bolts 28 while being disposed in an engine room with the input rod 10 protruding from the dash panel (not illustrated), which serves as a partition wall between the engine room of the vehicle and a vehicle compartment, into the vehicle compartment. The motor housing portion 23C is prepared as a different member from the first rear housing portion 23A and the second rear housing portion 23B, and is attached to the second rear housing portion 23B with use of a bolt.

The master cylinder 15 is attached to a front surface of the front housing 20. A rear end portion of the master cylinder 15 is disposed in proximity to the opening portion 21 in a recessed portion 19 provided on the front surface of the front housing 20. A bottomed cylinder bore 30 is formed in the master cylinder 15. The primary piston 31 is disposed on an opening portion side of this cylinder bore 30. A front portion of the primary piston 31 is disposed in the cylinder bore 30 of the master cylinder 15, and a rear portion of the primary piston 31 is inserted from the cylinder bore 30 of the master cylinder 15 into the opening portion 21 provided on the front housing 20 to extend into the housing 3 of the electric booster 1. The front portion and the rear portion of this primary piston 31 are each formed into a cupped shape, and are formed into an H-like shape in cross section. A spherical recessed portion 35 is formed on a rear surface of an intermediate wall 34 provided at a generally axially central position of the primary piston 31. A spherical surface 143 of a pressing rod 142 of an output rod 137, which will be described below, is in abutment with this spherical recessed portion 35. The cupped secondary piston 32 is disposed on a bottom portion side of the cylinder bore 30. Then, the primary chamber 37 is formed between the primary piston 31 and the secondary piston 32 and the secondary chamber 38 is formed between the bottom portion of the cylinder bore 30 and the secondary piston 32 in the cylinder bore 30 of the master cylinder 15.

The primary chamber 37 and the secondary chamber 38 in the master cylinder 15 are in communication with a hydraulic control unit (not illustrated) from two hydraulic ports 52 and 52 (refer to FIG. 1) of the master cylinder 15 via two actuation conduit systems (not illustrated), respectively. This hydraulic control unit is in communication with each of wheel cylinders (not illustrated) of individual wheels via four foundation conduit systems (not illustrated). Then, a braking force is generated by supplying a hydraulic pressure of the brake fluid generated by the master cylinder 15 or the hydraulic control unit to the wheel cylinder of each of the wheels.

Reservoir ports 44 and 45 are provided on the master cylinder 15. The reservoir ports 44 and 45 are used to connect the primary chamber 37 and the secondary chamber 38 to the reservoir 16, respectively. Annular piston seals 47, 48, 49, and 50 in abutment with the primary piston 31 and the secondary piston 32 are disposed on an inner peripheral surface of the cylinder bore 30 at predetermined intervals along an axial direction to partition the inside of the cylinder bore 30 into the primary chamber 37 and the secondary chamber 38. The piston seals 47 and 48 are disposed so as to sandwich the reservoir port 44, which is one of the reservoir ports (the rear side), along the axial direction. When the primary piston 31 is located at a non-braking position thereof illustrated in FIG. 4, the primary chamber 37 is in communication with the reservoir port 44 via a piston port 62 provided on a side wall of the primary piston 31. Then, when the primary piston 31 moves forward from the non-braking position thereof and the piston port 62 reaches the piston seal 48, which is one of the piston seals (the front side), the hydraulic pressure is generated with the primary chamber 37 disconnected from the reservoir port 44 by the piston seal 48.

Similarly, the remaining two piston seals 49 and 50 are disposed so as to sandwich the reservoir port 45, which is the other of the reservoir ports (the front side), along the axial direction. When the primary piston 32 is located at a non-braking position thereof illustrated in FIG. 4, the secondary chamber 38 is in communication with the reservoir port 45 via a piston port 63 provided on a side wall of the secondary piston 32. Then, when the secondary piston 32 moves forward from the non-braking position thereof and the piston port 63 reaches the piston seal 50, which is one of the piston seals (the front side), the hydraulic pressure is generated with the secondary chamber 38 disconnected from the reservoir port 45 by the piston seal 50.

A compression coil spring 65 is disposed between the primary piston 31 and the secondary piston 32. The compression coil spring 65 exerts a biasing force in a direction for separating the primary piston 31 and the secondary piston 32 away from each other. An extension/compression member 66 extensible and compressible in a predetermined range is disposed inside the compression coil spring 65. This extension/compression member 66 includes a retainer guide 67 and a retainer rod 68. The retainer guide 67 is in abutment with the intermediate wall 34 of the primary piston 31. The retainer rod 68 has a front end in abutment with the secondary piston 32 and is axially movable in this retainer guide 67. The retainer guide 67 is cylindrically formed, and includes, at a front end thereof, a stopper portion 67A provided in a manner protruding inward. The retainer rod 68 includes, at a rear end thereof, a flange portion 68A provided in a manner protruding radially outward. Then, inserting the retainer rod 68 into the retainer guide 67 allows these retainer guide 67 and the retainer rod 68 to move relative to each other along the axial direction, and the extension/compression member 66 is maximumly extended when the stopper portion 67A of the retainer guide 67 and the flange portion 68A of the retainer rod 68 interfere with each other.

A compression coil spring 71 is disposed between the bottom portion of the cylinder bore 30 and the secondary piston 32. The compression coil spring 71 exerts a biasing force in a direction for separating the bottom portion of the cylinder bore 30 and the secondary piston 32 away from each other. An extension/compression member 72 extensible and compressible in a predetermined range is also disposed inside the compression coil spring 71. This extension/compression spring 72 includes a retainer guide 73 and a retainer rod 74. The retainer guide 73 has a front end in abutment with the bottom portion of the cylinder bore 30. The retainer rod 74 has a rear end in abutment with the secondary piston 32 and is axially movable in this retainer guide 73. The retainer guide 73 is cylindrically formed, and includes, at a rear end thereof, a stopper portion 73A provided in a manner protruding inward. The retainer rod 74 includes, at a front end thereof, a flange portion 74A provided in a manner protruding radially outward. Then, inserting the retainer rod 74 into the retainer guide 73 allows these retainer guide 73 and the retainer rod 74 to move relative to each other along the axial direction, and the extension/compression member 72 is maximumly extended when the stopper portion 73A of the retainer guide 73 and the flange portion 74A of the retainer rod 74 interfere with each other.

The input plunger 11 and the thrust member 110 are each disposed from a radially inner side inside the cylindrical portion 24 of the first rear housing portion 23A. The input rod 10 of the input member 4 is concentrically disposed in the cylindrical portion 24 of the first rear housing portion 23A. A rear end side of the input rod 10 protrudes out of the cylindrical portion 24. The input rod 10 includes a small-diameter rod portion 80, a large-diameter rod portion 81, and a spring bearing portion 82. The large-diameter rod portion 81 integrally extends continuously outward from this small-diameter rod portion 80. The spring bearing portion 82 is provided at a stepped portion between the small-diameter rod portion 80 and the large-diameter rod portion 81. The small-diameter rod portion 80 has a diameter gradually reducing frontward, and the ball joint portion 85 is formed at a front end thereof. This ball joint portion 85 is coupled with a spherical recessed portion 100 at a rear end of the input plunger 11. A rear end portion of the large-diameter rod portion 81 of the input rod 10 is connected to a crevice 90. Then, the input rod 10 is coupled with the brake pedal 13 via the crevice 90. This configuration leads to a movement of the input rod 10 along the axial direction according to the operation performed on the brake pedal 13.

The input plunger 11 is formed into a rod-like shape as a whole, and is disposed concentrically with the input rod 10. The input plunger 11 includes a first rod portion 91, a second rod portion 92, and a cylindrical swaged portion 93. The second rod portion 92 extends integrally frontward from the first rod portion 91, and has a smaller diameter than the first rod portion 91. The cylindrical swaged portion 93 extends integrally backward from the first rod portion 91. A stepped portion between the first rod portion 91 and the second rod portion 92 functions as a spring bearing portion 94. The spherical recessed portion 100 is formed at a radially central portion on a rear end surface of the first rod portion 91. The ball joint portion 85 of the input rod 10 is coupled with the spherical recessed portion 100. An annularly extending annular groove portion 97 is formed on an outer peripheral surface of the first rod portion 91. A pin member 185 is inserted at a portion of the input plunger 11 on a front side with respect to the annular groove portion 97. The pin member 185 extends from a magnet holder 175 of the stroke detection device 7.

The cylindrical swaged portion 93 of the input plunger 11 is formed so as to have a larger diameter than an outer diameter of the first rod portion 91. An annular recessed portion 101 is formed on an outer peripheral surface of the cylindrical swaged portion 93. The annular recessed portion 101 is used to insert a swaging tool. A conical opening portion 102 is formed in the cylindrical swaged portion 93. The conical opening portion 102 has a diameter gradually reducing frontward. A front end of this conical opening portion 102 is continuous to a rear end of the spherical recessed portion 100. The cylindrical swaged portion 93 is formed in such a manner that an outer diameter of a rear-side rod portion 103 on a rear side with respect to the annular recessed portion 101 is larger than an outer diameter of a front-side rod portion 104 on a front side with respect to the annular recessed portion 101. A ratio plate 105 is in abutment with a front end surface of the second rod portion 92. The ratio plate 105 includes a disk-shaped pressing portion 106 and a rod portion 107. The rod portion 107 extends backward integrally from a radial center of the disk-shaped pressing portion 106, and is formed so as to have a smaller diameter than the disk-shaped pressing portion 106. A rear end of the rod portion 107 of the ratio plate 105 is in abutment with the front end surface of the second rod portion 92 of the input plunger 11.

The thrust member 110 is disposed on a radially outer side of the input plunger 11. The thrust member 110 is formed cylindrically as a whole, and is disposed concentrically with the input plunger 11. The thrust member 110 is supported movably along the axial direction relative to the cylindrical portion 24 of the first rear housing portion 23A on the radially outer side of the input plunger 11. The thrust member 110 includes a small-diameter portion 117 and a large-diameter portion 118. The small-diameter portion 117 is disposed in the cylindrical portion 24, and has an outer diameter approximately equal to an inner diameter of the cylindrical portion 24. The large-diameter portion 118 is formed integrally frontward from this small-diameter portion 117, and has a larger diameter than this small-diameter portion 117. The thrust member 110 includes a first opening portion 111, a second opening portion 112, a third opening portion 113, a fourth opening portion 114, a fifth opening portion 115, and a sixth opening portion 116. The first opening portion 111 is opened on a rear end of the thrust member 110. The second opening portion 112 is formed continuously frontward from this first opening portion 111, and has a smaller diameter than the first opening portion 111. The third opening portion 113 is formed continuously frontward from this second opening portion 112, and has a smaller diameter than the second opening portion 112. The fourth opening portion 114 is formed continuously frontward from this third opening portion 113, and has a larger diameter than the third opening portion 113. The fifth opening portion 115 is formed continuously frontward from this fourth opening portion 114, and has a considerably larger diameter than the first opening portion 111. The sixth opening portion 116 is continuous frontward from this fifth opening portion 115 and is also opened on a front end of the thrust member 110, and is formed so as to have a larger diameter than the fifth opening portion 115. These first to sixth opening portions 111 to 116 are formed concentrically with one another. A spring bearing portion 121 is formed at a stepped portion between the second opening portion 112 and the third opening portion 113.

The rear-side rod portion 103 of the cylindrical swaged portion 93 of the input plunger 11 is disposed in the first opening portion 111 of the thrust member 110. The first rod portion 91 of the input plunger 11 and a portion of the second rod portion 92 except for a front portion thereof are disposed in the second opening portion 112 of the thrust member 110. The front portion of the second rod portion 92 of the input plunger 11 and the rod portion 107 of the ratio plate 105 are disposed in the third opening portion 113 of the thrust member 110. The disk-shaped pressing portion 106 of the ratio plate 105 is disposed in the fourth opening portion 114 of the thrust member 110. A reaction disk 135, which will be described below, is disposed in the fifth opening portion 115 of the thrust member 110.

A force transmission flange portion 123 is provided in a manner protruding radially outward on an outer peripheral surface of a front end of the large-diameter portion 118 of the thrust member 110. A cutout portion 119 is formed on an outer peripheral surface of a lower portion of the thrust member 110. At the cutout portion 119, the first and second opening portions 111 and 112 are opened downward. This cutout portion 119 is formed from the rear end of the thrust member 110 to a position of the second opening portion 112 on a front side with respect to an axial center thereof. A radially extending elongated slit is formed at the thrust member 110 so as to penetrate through radially, and forms a pair of groove portions 120 and 120 facing an inner wall surface of the second opening portion 112. The groove portions 120 are formed in such a manner that a length of each of the groove portions 120 at this second opening portion 112 along the axial direction (a length of the slit along the axial direction) is longer than a length of an annular groove portion 97 along the axial direction. The annular groove portion 97 is provided on the outer peripheral surface of the first rod portion 91 of the input plunger 11. Then, a pair of sandwiching members 122 and 122 of a stop key (not illustrated), which integrates the thrust member 110 and the input plunger 11 while permitting them to move relative to each other in a predetermined range along the axial direction, is engaged between each of the groove portions 120 and 120 provided on the inner wall surface of the second opening portion 112 of the thrust member 110 and the annular groove portion 97 provided on the first rod portion 91 of the input plunger 11.

Figure 1:
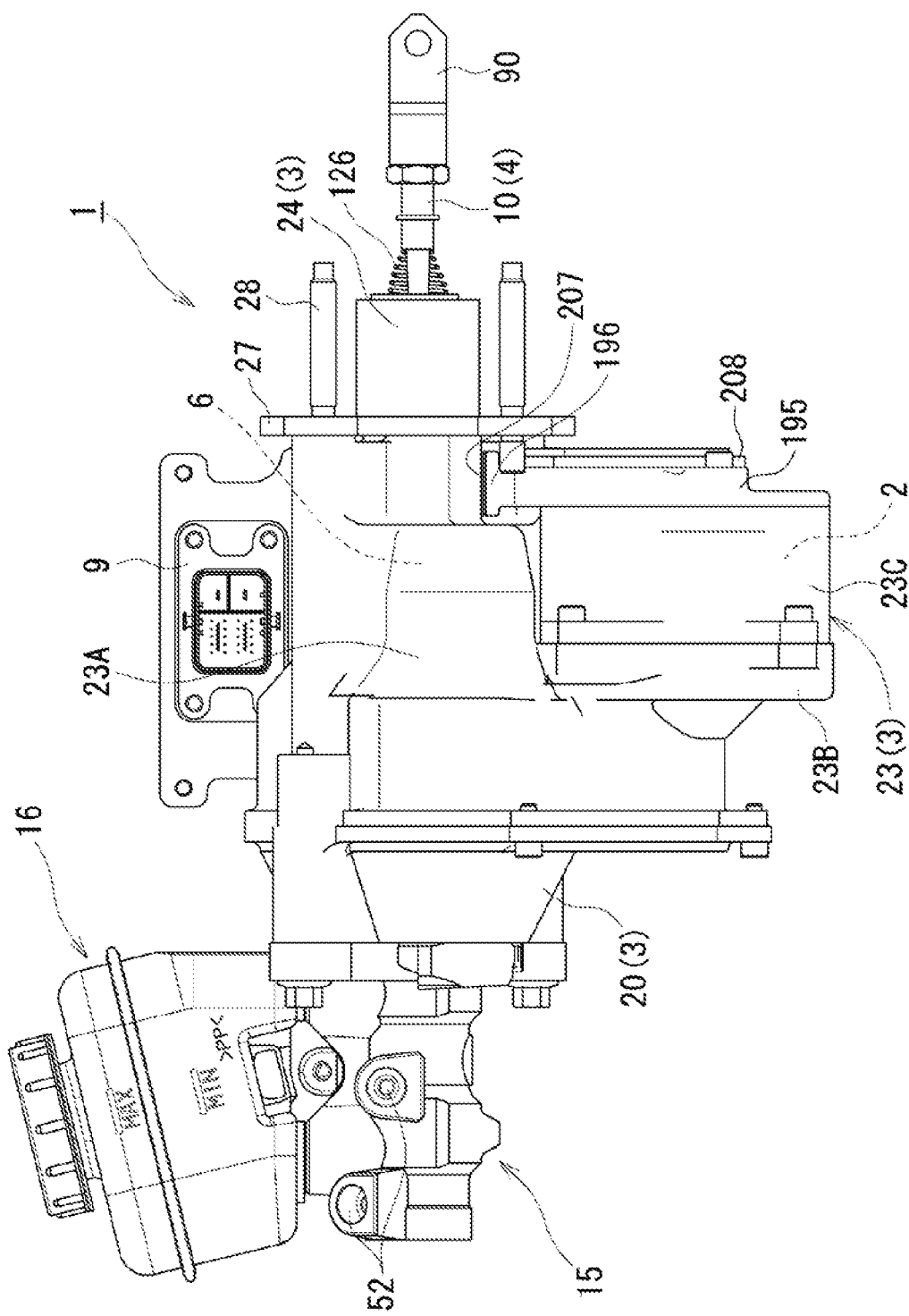
FIG. 1 is a side view of an electric booster according to an embodiment of the present invention.
Figure 2:
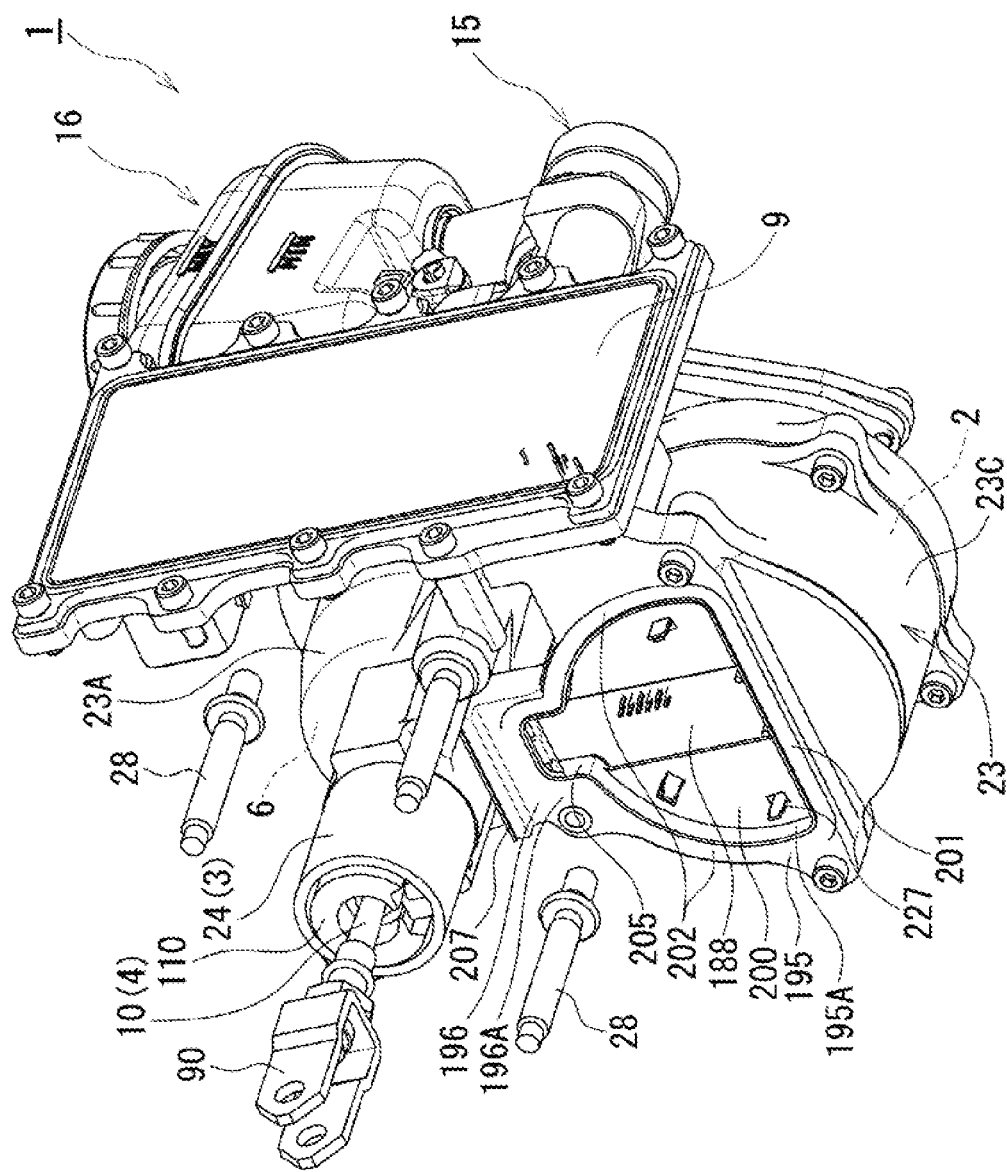
FIG. 2 is a perspective view of the electric booster according to the present embodiment.
Figure 3:
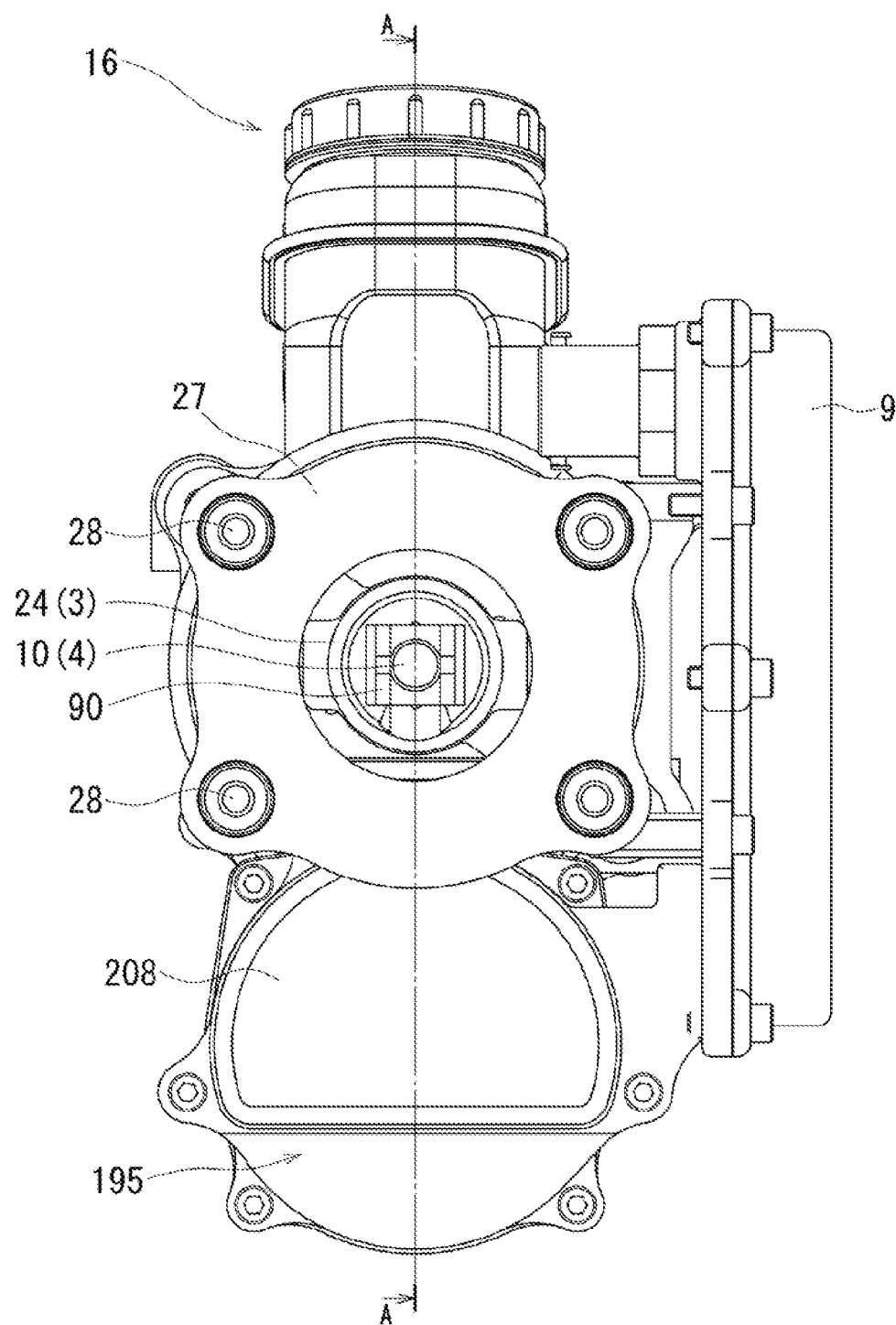
FIG. 3 is a rear view of the electric booster according to the present embodiment.

The fourth opening portion 114 of the thrust member 110 is formed in such a manner that an axial length thereof is longer than a length of the disk-shaped pressing portion 106 of the ratio plate 105 along the axial direction. In an initial state, a clearance is formed between the front end of the ratio plate 105 and the reaction disk 135, which will be described below. The thrust member 110 and the input member 4 (the input rod 10 and the input plunger 11) are permitted to move relative to each other in the predetermined range as described above. As illustrated in FIG. 2, a compression coil spring 130 is disposed between a front surface of the force transmission flange portion 123 of the thrust member 110 and the annular wall surface 22 in the front housing 20. The thrust member 110 is biased backward by a biasing force of this compression coil spring 130.

The resistive force application mechanism 5 includes a first compression coil spring 125, a second compression coil spring 126, and a spring support member 127. The first compression coil spring 125 exerts a biasing force in a direction for separating the thrust member 110 and input plunger 11 away from each other along the axial direction. The second compression coil spring 126 exerts a biasing force in a direction for separating the cylindrical portion 24 and the input rod 10 away from each other along the axial direction. The spring support member 127 supports the second compression coil spring 126 at the rear end of the cylindrical portion 24. An outer shape of the first compression coil spring 125 is formed into a columnar shape. This first compression coil spring 125 is disposed between a spring bearing portion 121 between the second opening portion 112 and the third opening portion 113 of the thrust member 110, and a spring bearing portion 94 between the first rod portion 91 and the second rod portion 92 of the input plunger 11.

The spring support member 127 is formed into a cupped shape as a whole, and includes a through-hole 128 formed at a radially central portion thereof. The input rod 10 is inserted through the through-hole 128. Then, the spring support member 127 is disposed along the inner peripheral surface of the thrust member 110, and a rear end thereof is in abutment with the rear end surface of the cylindrical portion 24. A front end of the spring support member 127 is disposed in proximity to the rear end of the input plunger 11. The second compression coil spring 126 is disposed between the inside of the spring support member 127 and the spring bearing portion 82 of the input rod 10. An outer shape of the second compression coil spring 126 is formed into a circular truncated cone-like shape having a diameter reducing backward. Then, due to this resistive force application mechanism 5, the electric booster 1 can generate such a hysteresis characteristic that the reaction force to the brake pedal 13 largely transitions when the brake pedal 13 is pressed (when the input member 4 moves forward), and the reaction force to the brake pedal 13 more slightly transitions when the brake pedal 13 is released from being pressed (when the input member 4 moves rearward) than when the brake pedal 13 is pressed.

The generally disk-shaped reaction disk 135 is disposed in the fifth opening portion 115 of the thrust member 110 in abutment therewith. This reaction disk 135 is made of an elastic member such as rubber. The output rod 137 includes a rod portion 138 generally circular in cross section, a disk-shaped portion 139, and the pressing rod 142. The disk-shaped portion 139 is integrally provided at a rear end of this rod portion 138, and is formed so as to have a larger diameter than the rod portion 138. The pressing rod 142 is coupled with a front end of the rod portion 138. The disk-shaped portion 139 of the output rod 137 is formed so as to have an equal diameter to the reaction disk 135. This disk-shaped portion 139 is disposed in the fifth opening portion 115 of the thrust member 110 in abutment with the reaction disk 135. A fixation hole 140 is formed so as to have a predetermined depth on a front end surface of the rod portion 138. The pressing rod 142 is fixed in this fixation hole 140. The front end surface of the pressing rod 142 is formed into a spherical surface 143. Then, a front portion of the rod portion 138 of the output rod 137 and the pressing rod 142 extend toward the intermediate wall 34 of the primary piston 31, and the spherical surface 143 provided on the front end surface of the pressing rod 142 of the output rod is in abutment with the spherical recessed portion 35 provided on the rear surface of the intermediate wall 34 of the primary piston 31.

The rotation-linear motion conversion mechanism 6 functions to convert a rotational motion from the electric motor 2 disposed in the housing 3 into a linear motion of a sun shaft member 147, thereby applying a thrust force to the primary piston 31 via the thrust member 110. The rotation-linear motion conversion mechanism 6 includes a nut member 145, a plurality of planetary shaft members 146, and the sun shaft member 147. The nut member 145 is supported rotatably relative to the housing 3 by a bearing 150. Inner groove portions 154 are formed on an inner peripheral surface of a rear side of the nut member 145. The inner groove portions 154 extend circumferentially, and are provided consecutively at intervals along the axial direction. The sun shaft member 147 is concentrically disposed inside the nut member 145.

The sun shaft member 147 is cylindrically formed. This sun shaft member 147 is supported on an outer periphery of the large-diameter portion 118 of the thrust member 110 so as to be prohibited from rotating relative to the housing 3 but permitted to move along the axial direction relative the housing 3. A front end surface of the sun shaft member 147 is in abutment with a rear surface of the force transmission flange portion 123 of the thrust member 110. Outer groove portions 155 are formed on an outer peripheral surface of the sun shaft member 147. The outer groove portions 155 extend circumferentially, and are provided consecutively at intervals along the axial direction. The planetary shaft members 146 are each formed into a rod-like shape. This plurality of planetary shaft members 146 is disposed along the circumferential direction between the nut member 145 and the sun shaft member 147. Groove portions 156 are formed on outer peripheral surfaces of the planetary shaft members 146. The groove portions 156 are engaged with each of the inner groove portions 154 of the nut member 145 and the outer groove portions 155 of the sun shaft member 147. The groove portions 156 extend along the circumferential direction, and are provided consecutively at intervals along the axial direction.

Then, the inner groove portions 154 of the nut member 145 and the groove portions 156 of the individual planetary shaft members 146 are engaged with each other. More specifically, the following embodiment may be employed. The inner groove portions 154 of the nut member 145 are formed as a plurality of annular groove portions extending annularly and formed at intervals in the axial direction. The groove portions 156 of the individual planetary shaft members 146 are formed as a plurality of annular groove portions having the same pitch as the annular groove portions of the nut member 145, extending annularly, and formed at intervals in the axial direction. Then, these grooves 154 and 156 are engaged with each other. Alternatively, the following embodiment may be employed. The inner groove portions 154 of the nut member 145 are formed as positive screw groove portions helically extending toward a positive direction. The groove portions 156 of the individual planetary shaft members 146 are formed as positive screw groove portions having equal lead angles to the positive screw groove portions of the inner groove portions 154 of the nut member 145 and helically extending toward the positive direction. Then, these grooves 154 and 156 are engaged with each other. Further alternatively, the following embodiment may be employed. The inner groove portions 154 of the nut member 145 are formed as reverse screw groove portions helically extending toward a reverse direction. The groove portions 156 of the individual planetary shaft members 146 are formed as reverse screw groove portions having equal lead angles to the reverse screw groove portions of the nut member 145 and helically extending toward the reverse direction. Then, these grooves 154 and 156 are engaged with each other.

The groove portions 156 of the individual planetary shaft members 146 and the external groove portions 155 of the sun shaft member 147 are engaged with each other. More specifically, in the case where the groove portions 156 of the individual planetary shaft members 146 are formed as the plurality of annular groove portions extending annularly and formed at intervals in the axial direction, the external groove portions 155 of the sun shaft member 147 are formed as positive screw groove portions or reverse screw groove portions helically extending toward the positive direction or the reverse direction. Alternatively, in the case where the groove portions 156 of the individual planetary shaft members 146 are formed as the positive screw groove portions helically extending toward the positive direction, the outer groove portions 155 of the sun shaft member 147 may be formed as a plurality of annular groove portions extending annularly and formed at intervals in the axial direction, may be formed as positive screw groove portions having equal lead angles to the positive screw groove portions of the planetary shaft members 146 and helically extending toward the positive direction, or may be formed as reverse screw groove portions having different lead angles from the positive screw groove portions of the planetary shaft members 146 and helically extending toward the reverse direction.

Further alternatively, in the case where the groove portions 156 of the individual planetary shaft members 146 are formed as the reverse screw groove portions helically extending toward the reverse direction, the outer groove portions 155 of the sun shaft member 147 may be formed as a plurality of annular groove portions extending annularly and formed at intervals in the axial direction, may be formed as reverse screw groove portions having equal lead angles to the reverse screw groove portions of the individual planetary shaft members 146 and helically extending toward the reverse direction, or may be formed as positive screw groove portions having different lead angles from the reverse screw groove portions of the individual planetary shaft members 146 and helically extending toward the positive direction.

As a result, due to the engagement between the inner groove portions 154 of the nut member 145 and the groove portions 156 of the individual planetary shaft members 146, and the engagement between the groove portions 156 of the individual planetary shaft members 146 and the outer groove portions 155 of the sun shaft member 147, the rotational motion of the nut member 145 causes the individual planetary shaft members 146 to carry out planetary motions of revolving around the axis of the sun shaft member 147 while rotating around their own axes, and also causes the sun shaft member 147 to carry out a linear motion along the axial direction relative to the housing 3 due to the planetary motions of the individual planetary shaft members 146.

Figure 5:
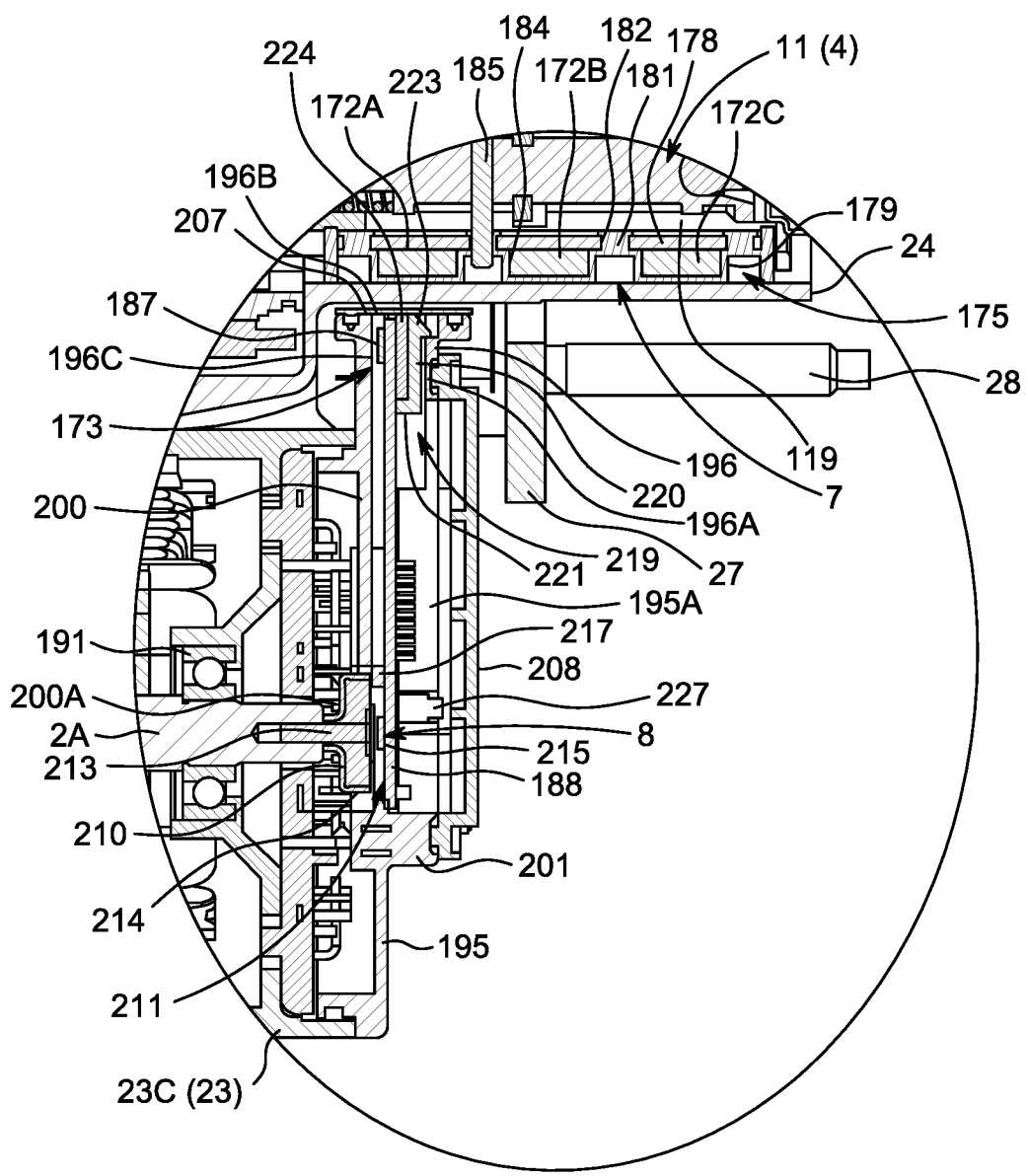
FIG. 5 is an enlarged view of main portions illustrated in FIG. 4.

As illustrated in FIGS. 4 and 5, the stroke detection device 7 functions to detect the movement amount of the input member 4 (the input rod 10 and the input plunger 11) based on the operation amount on the brake pedal 13. The stroke detection device 7 includes a plurality of magnet members 172A, 172B, 172C, and a Hall sensor unit 173. Each of the magnet members 172A, 172B, and 172C corresponds to a first magnet. In the present embodiment, the magnet members 172A, 172B, and 172C are disposed at three portions. The magnet members 172A, 172B, and 172C are not limited to three magnet members, and may be any number of magnets as long as they are one or more magnets. Each of the magnet members 172A, 172B, and 172C is held by a magnet holder 175 molded from synthetic resin. The magnet holder 175 includes a plate-shaped base member 178 and a holder portion 179 fitted to this base member 178. This magnet holder 175 is disposed between the cutout portion 119 provided on the outer peripheral surface of the thrust member 110 and the inner wall surface of the cylindrical portion 24 of the first rear housing portion 23A. The magnet holder 175 is supported movably along the axial direction.

The base member 178 is formed into a plate-like shape. A fitting hole 182 is formed on this base member 178 at a position corresponding to a fitting claw portion 181. The fitting claw portion 181 of the holder member 179, which will be described below, is fitted in the fitting hole 182. A plurality of containing recessed portions 184 is formed on the holder portion 179 at intervals along the axial direction of the input rod 10. This plurality of containing recessed portions 184 is formed as many as the number of magnet members 172A, 172B, and 172C (three portions in the case of FIG. 5). Each of portions of the containing recessed portion 184 on both axial sides is recessed toward a radially inner side of the input rod 10, and then the fitting claw portion 181 is provided in a protruding manner from a bottom portion thereof toward a radially inner side.

Then, each of the magnet members 172A, 172B, and 172C can be held so as to be sandwiched between the holder portion 179 and the base member 178 by placing the magnet members 172A, 172B, and 172C made of cuboids into the individual containing recessed portions 184, 184, and 184 of the holder portion 179, respectively, and fitting the individual fitting claw portions 181 of the holder member 179 to the individual fitting holes 182 of the base member 178, respectively. Further, a pin member 185 is provided on the second fitting claw portion 181 from the front side in the holder portion 179 in a manner extending toward the input plunger 11. This pin member 185 is inserted through the portion of the input plunger 11 on the front side with respect to the annular groove portion 97. This allows the magnet holder 175, i.e., the magnet members 172A, 172B, and 172C to move according to the movement of the input plunger 11.

On the other hand, the Hall sensor unit 173 functions to output a signal indicating the movement amount of the input member 4 based on a magnetic flux density generated from each of the magnet members 172A, 172B, and 172C held in the magnet holder 175. The Hall sensor unit 173 is disposed in a casing 195 placed behind the electric motor 2. The Hall sensor unit 173 includes a Hall IC chip 187 and an electronic substrate 188. The Hall IC chip 187 detects the magnetic flux density from each of the magnet members 172A, 172B, and 172C. The Hall IC chip 187 is mounted on the electronic substrate 188. The Hall IC chip 187 corresponds to a first magnetism detection element. Then, the Hall sensor unit 173 can detect a movement amount of the magnet holder 175 including each of the magnet members 172A, 172B, and 172C, and thus the movement amount of the input member 4 by detecting a change in the magnetic flux density from each of the axially moving magnet members 172A, 172B, and 172C with use of the Hall IC chip 187.

The casing 195 is fixed to the motor housing portion 23C containing the electric motor 2 so as to cover the other end side (the rear end side) of the rotational shaft 2A of the electric motor 2, i.e., so as to be positioned behind the electric motor 2. An outer shape of the casing 195 is formed into a generally circular shape, and includes an inner space 195A. A protrusion portion 196 is integrally provided on this casing 195 in a manner protruding toward the magnet members 172A, 172B, and 172C, i.e., the cylindrical portion 24. The protrusion portion 196 includes a hollow portion 196C therein. The casing 195 and the protrusion portion 196 may be configured to be prepared as different members and welded to each other. The protrusion portion 196 is disposed so as to face the magnet members 172A, 172B, and 172C, which allows a distal end of the protrusion portion 196 to be located as close to the outer peripheral surface of the cylindrical partition 24 of the first rear housing portion 23A as possible. More specifically, as illustrated in FIGS. 2, 4, and 5, the casing 195 includes a generally circular front-side wall portion 200, a linear wall portion 201, a pair of curved wall portions 202 and 202, and the protrusion portion 196. The front-side wall portion 200 is located behind the electric motor 2. The linear wall portion 201 is erected from the front-side wall portion 200 rearward, and extends linearly at a position maximumly spaced apart from the cylindrical portion 24. The pair of curved wall portions 202 and 202 extend from both ends of this linear wall portions 201 along an outer periphery of the front-side wall portion 200, respectively. The protrusion portion 196 protrudes from both ends of each of the curved wall portions 202 and 202 in the form of a rectangular tube. A rear-side wall portion 196A of the protrusion portion 196 has an opening 205 having a square-cornered U shape.

Then, the casing 195 includes the inner space 195A in a range defined by adding the hollow portion 196C in the protrusion portion 196 to a range surrounded by the front-side wall portion 200, the linear wall portion 201, and each of the curved wall portions 202 and 202. An opening portion 200A is formed on the front-side wall portion 200 in a range facing the rotational shaft 2A of the electric motor 2. An opening 196B at a distal end of this protrusion portion 196 is closed by a thin plate-shaped first casing cover 207. The inner space 195A is closed due to abutment of a second casing cover 208 with a rear end of the linear wall portion 201 of the casing 195, a rear end of each of the curved wall portions 202 and 202, and an edge portion of the protrusion portion 196 along the squared U-shaped opening 205.

As illustrated in FIGS. 4 and 5, the electric motor 2 is disposed around a different axis from the master cylinder 15, the input member 4, and the rotation-linear motion conversion mechanism 6. The electric motor 2 is contained in the generally cylindrical motor housing portion 23C. The rotational shaft 2A of the electric motor 2 extends generally in parallel with a movement direction of the input member 4, and is rotatably supported by each of bearings 190 and 191. One end portion (the front end portion) of the rotational shaft 2A extends into the second rear housing portion 23B. The rotational angle detection portion 8 functions to detect rotational angle of the rotational shaft 2A of the electric motor 2, and includes a magnet member 210 and a sensor unit 211. The magnet member 210 corresponds to a second magnet member. A support rod 213 is provided at the other end (the rear end) of the rotational shaft 2A so as to extent therefrom. A cupped support member 214 is attached around the support rod 213, and the ring-shaped magnet member 210 is supported in this support member 214. The magnet member 210 including the support member 214 is disposed in the opening portion 200A of the front-side wall portion 200 of the casing 195.

On the other hand, the sensor unit 211 functions to output a signal indicating the rotational angle of the rotational shaft 2A based on a change in a magnetic field generated from the magnet member 210 supported by the support rod 213. The Hall sensor unit 211 includes a magnetism detection IC chip 215 and an electronic substrate 188. The magnetism detection IC chip 215 detects the change in the magnetic field from the magnet member 210. The magnetism detection IC chip 215 is mounted on the electronic substrate 188. The magnetism detection IC chip 215 corresponds to a second magnetism detection element. Then, the sensor unit 211 can detect the rotational angle of the rotational shaft 2A of the electric motor 2 by detecting the change in the magnet flux from the rotating magnet member 210 with use of the magnetism detection IC chip 215. The electronic substrate 188 is shared with the stroke detection device 7 as the electronic substrate 188 thereof. This electronic substrate 188 is electrically connected to the controller 9. The electronic substrate 188 is shared in common between the rotational angle detection portion 8 and the stroke detection device 7 in the present embodiment, but the electronic substrates 188 of them may be constructed separately from each other.

The electronic substrate 188 has a generally rectangular shape extending in a longitudinal direction, and is disposed from around the rotational shaft 2A of the electric motor 2 toward the input plunger 11 (the input member 4) side in the casing 195 disposed on the other end side (the rear end side) of the rotational shaft 2A of the electric motor 2. In other words, the electronic substrate 188 is disposed in a range extending from around the rotational shaft 2A of the electric motor 2 to the protrusion portion 196. The electronic substrate 188 is disposed in such a manner that both surfaces thereof face a frontward/rearward direction. A surface of the electronic substrate 188 on the electric motor 2 side (a front surface) faces the other end surface (the rear end surface) of the rotational shaft 2A. The Hall IC chip 187 of the Hall sensor unit 173 of the stroke detection device 7 and the magnetism detection IC chip 215 of the sensor unit 211 of the rotational angle detection portion 8 are each disposed on the surface of the electronic substrate 188 on the electric motor 2 side (the front surface). The Hall IC chip 187 of the Hall sensor unit 173 of the stroke detection device 7 is disposed at a position as close to the magnet members 172A, 172B, and 172C as possible in the protrusion portion 196 of the casing 195 on the electronic substrate 188. On the other hand, the magnetism detection IC chip 215 of the sensor unit 211 of the rotational angle detection portion 8 is disposed at a position in proximity to the magnet member 210 provided at the other end portion (the rear end portion) of the rotational shaft 2A of the electric motor 2 on the electronic substrate 188.

A thermistor 217 is disposed on the cylindrical portion 24 side with respect to the magnetism detection IC chip 215 of the rotational angle detection portion 8 on the surface of the electronic substrate 188 on the electric motor 2 side. The thermistor 217 is used to measure a temperature of the electric motor 2. A sandwiching member 219 generally L shaped in cross section is disposed on a surface on the input rod 10 side (a rear surface) at a portion of the electronic substrate 188 that is disposed in the protrusion portion 196 (the hollow portion 196C). The sandwiching member 219 includes a sandwiching portion 220 and a support portion 221. The sandwiching portion 220 extends in parallel with the electronic substrate 188. The support portion 221 extends from one end of this sandwiching portion 220 toward the electronic substrate 188 and a distal end thereof is in abutment with the electronic substrate 188. An engagement claw portion 223 is provided at an end portion of the sandwiching portion 220 on the cylindrical portion 24 side, and this engagement claw portion 223 is engaged with an inner wall surface of the rear-side wall portion 196A of the protrusion portion 196 formed on the casing 195. A spacer 224 is disposed between the sandwiching portion 220 and the electronic substrate 188 so as not to generate any space there. The electronic substrate 188 can be prevented from vibrating by being configured in this manner.

A plurality of bus bars 227 is stored in the casing 195. The bus bars 227 serve as wirings that supply a driving current from the controller 9 to the electric motor 2. The controller 9 controls the driving current to the electric motor 2. The electric motor 2 and the controller 9 are electrically connected to each other via these bus bars 227.

The transmission member 229 is disposed on one end side of the rotational shaft 2A of the electric motor 2, i.e., the master cylinder 15 side. The transmission member 229 transmits the rotational torque of the electric motor 2. This transmission member 229 includes an external gear 231, an intermediate gear 232, and a main gear 233. The external gear 231 is provided on an outer peripheral surface of the one end of the rotational shaft 2A. The intermediate gear 232 is meshed with this external gear 231. The main gear 233 is meshed with this intermediate gear 232, and is fixed to an outer peripheral surface of the nut member 145 of the rotation-linear motion conversion mechanism 6. The intermediate gear 232 is rotatably supported by a shaft member 235 via a bearing 236. The shaft member 235 is provided in a protruding manner in the second rear housing portion 23B. Then, the rotation from the rotational shaft 2A of the electric motor 2 is transmitted to the nut member 145 of the rotation-linear motion conversion mechanism 6 via the transmission member 229, i.e., the external gear 231, the intermediate gear 232, and the main gear 233.

As illustrated in FIGS. 1 to 4, the controller 9 functions to control the driving of the electric motor 2 so as to thrust the thrust member 110 of the rotation-linear motion conversion mechanism 6 by driving the electric motor 2 and generate the brake hydraulic pressure in each of the primary chamber 37 and the secondary chamber 38 in the master cylinder 15 at a desired booting ratio based on, for example, detection signals from various kinds of sensors such as the stroke detection device 7, the rotational angle detection portion 8, and a current sensor (not illustrated) that detects a current value supplied to the electric motor 2, and a signal from a hydraulic sensor (not illustrated) that detects a hydraulic pressure in each of the primary chamber 37 and the secondary chamber 38 in the master cylinder 15, which is acquired via a CAN. This controller 9 corresponds to a control device.

Next, an operation of the present electric booster 1 when power is supplied will be described.

When the brake pedal 13 is operated, i.e., the brake pedal 13 is pressed from a state illustrated in FIG. 2 in which the brake pedal 13 is not operated, the input plunger 11 moves forward together with the input rod 10 against the biasing forces of the first and second compression coil springs 125 and 126, and the ratio plate 105 in abutment with this input plunger 11 presses the reaction disk 135. Further, when the input member 4 (the input rod 10 and the input plunger 11) moves forward according to the operation on the brake pedal 13, the movement amount of the input member 4 is detected by the stroke detection device 7, and the rotational angle of the rotational shaft 2A of the electric motor 2 is also detected by the rotational detection portion 8. Based on respective detection results, the driving of the electric motor 2 is controlled by the controller 9.

Then, the rotation from the electric motor 2 is transmitted to the nut member 145 of the rotation-linear motion conversion mechanism 6 via the transmission member 229, i.e., the external gear 231, the intermediate gear 233, and the main gear 233. Subsequently, according to the rotation of the nut member 145, as each of the planetary shaft members 146 carries out the planetary motion of revolving around the axis of the sun shaft member 147 while rotating around its own axis, the sun shaft member 147 moves forward. Then, the forward movement of the sun shaft member 147 leads to a forward movement of the thrust member 110 against the biasing force of the compression coil spring 130. Due to this forward movement of the sun shaft member 147, the thrust member 110 moves forward while maintaining the relative position with the input member 4 as if following the input member 4 (the input rod 10 and the input plunger 11), and presses the reaction disk 135 together with the ratio plate 105.

As a result, the thrust force of the input member 4 according to the operation on the brake pedal 13 and the thrust force of the thrust member 110 from the electric motor 2 are transmitted to the output rod 137 via the reaction disk 135, and this output rod 137 moves forward, by which the primary piston 31 and the secondary piston 32 in the master cylinder 15 move forward.

As a result, the hydraulic pressure is generated in each of the primary chamber 37 and the secondary chamber 38 in the master cylinder 15, and the brake hydraulic pressure generated in each of these primary chamber 37 and secondary chamber 38 is supplied to the wheel cylinder of each of the wheels via the hydraulic control unit, by which the braking force due to frictional braking is generated. When the hydraulic pressure is generated in the master cylinder 15, the hydraulic pressure in each of the primary chamber 37 and the secondary chamber 38 is received by the ratio plate 105 of the input plunger 11 via the reaction disk 135, and this leads to transmission of a reaction force acquired by adding the resistive force from the resistive force application mechanism 5 (the biasing forces of the first and second compression coil springs 125 and 126) to a reaction force derived from this hydraulic pressure to the brake pedal 13 via the input member (the input rod 10 and the input plunger 11). Then, a desired braking force can be generated with a boosting ratio (a ratio of the hydraulic output to the operation input on the brake pedal 13) set based on a ratio between a pressure-receiving area of the front end surface of the thrust member 110 and a pressure-receiving area of the front end surface of the ratio plate 105 (the disk-shaped pressing portion 106) of the input plunger 11.

Next, when the operation on the brake pedal 13 is released, i.e., the pressing of the brake pedal 13 is released, the input member 4 moves rearward due to the biasing force from the first compression coil spring 125 (the biasing force from the second compression coil spring 126 is applied only at the beginning of the release) including the reaction force derived from the hydraulic pressure from the master cylinder 15 (the primary chamber 37 and the secondary chamber 38. Subsequently, the movement amount of the input member 4 is detected by the stroke detection device 7 and the rotational angle of the rotational shaft 2A of the electric motor 2 is also detected by the rotational angle detection portion 8. Based on respective detection results, the driving (a reverse rotation) of the electric motor 2 is controlled by the controller 9 and this reverse rotation is transmitted to the nut member 145 of the rotation-linear motion conversion mechanism 6. Subsequently, according to this reverse rotation of the nut member 145, as each of the planetary shaft members 146 carries out a planetary motion of revolving in a reverse direction around the axis of the sun shaft member 147 while rotating in a reverse direction around its own axis, the sun shaft member 147 moves rearward. According to this rearward movement of the sun shaft member 147, the biasing force of the compression coil spring 130 causes the thrust member 110 to move rearward while maintaining the relative displacement with the input member 4, ending up returning to the initial position. As a result, the primary piston 31 and the secondary piston 32 in the master cylinder 15 move rearward, and the hydraulic pressure reduces in each of the primary chamber 37 and the secondary chamber 38 in the master cylinder 15, by which the braking force is released.

In the above-described manner, the electric booster 1 according to the present embodiment is configured in such a manner that the Hall IC chip 187 of the Hall sensor unit 173 of the stroke detection device 7 and the magnetism detection IC chip 215 of the sensor unit 211 of the rotational angle detection portion 8 are disposed inside the casing 195 containing the bus bars 227 electrically connecting the electric motor 2 and the controller 9 to each other, thereby preventing or cutting down an increase in a size of the electric booster 1 and thus improving mountability onto the vehicle.

Further, the present electric booster 1 is configured in such a manner that the Hall IC chip 187 of the Hall sensor unit 173 of the stroke detection device 7 and the magnetism detection IC chip 215 of the sensor unit 211 of the rotational angle detection portion 8 are disposed on a single electric substrate 188, and the electric substrate 188 is shared therebetween, thereby being able to further prevent or cut down the increase in the size of the present electric booster 1.

Further, the present electric booster 1 is configured in such a manner that the electric substrate 188 extends from the rotational shaft 2A of the electric motor 2 toward the input member 4 side, thereby allowing the Hall IC chip 187 of the Hall sensor unit 173, which is the component of the stroke detection device 7, to be placed in proximity to the magnet members 172A, 172B, and 172C and also allowing the magnetism detection IC chip 215 of the sensor unit 211, which is the component of the rotational angle detection portion 8, to be placed in proximity to the magnet member 210, thus being able to ensure detection accuracy of the stroke detection device 7 and the rotational angle detection portion 8.

Furthermore, the present electric booster 1 is configured in such a manner that the electronic substrate 188 is disposed on the rear end side of the rotational shaft 2A of the electric motor 2 and the casing 195 is disposed so as to cover the rear end of the rotational shaft 2A of the electric motor 2, thereby allowing the inner space 195A of the casing 195 to be efficiently utilized.

Furthermore, the present electric booster 1 is configured in such a manner that the protrusion portion 196 is provided at the portion of the casing 195 facing each of the magnet members 172A, 172B, and 172C, which are the components of the stroke detection device 7, and the Hall IC chip 187 of the Hall sensor unit 173, which is the component of the stroke detection device 7, is disposed in this protrusion portion 196, thereby being able to ensure the detection accuracy of the stroke detection device 7.

Furthermore, the present electric booster 1 is configured in such a manner that the spacer 224 is disposed between the electronic substrate 188 and the inner wall surface of the casing 195 (the inner wall surface of the rear-side wall portion 196A), thereby being able to prevent or reduce deterioration of the detection accuracy of the stroke detection device 7 and the rotational angle detection portion 8 and damage on the electronic substrate 188 due to a vibration of the electronic substrate 188, thus being able to improve reliability.

Figure 6:
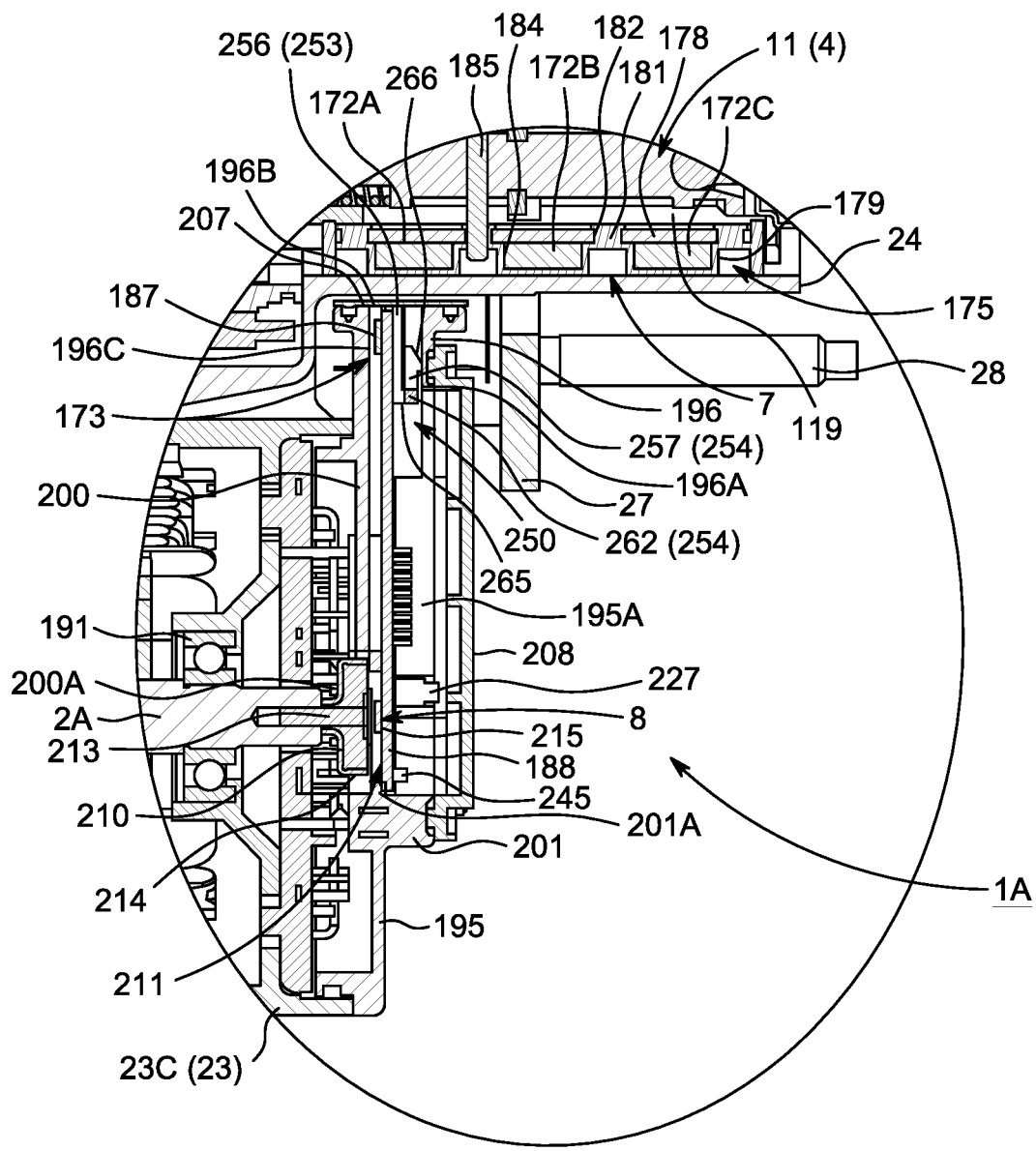
FIG. 6 is an enlarged view of main portions of an electric booster according to another embodiment.
Figure 7:
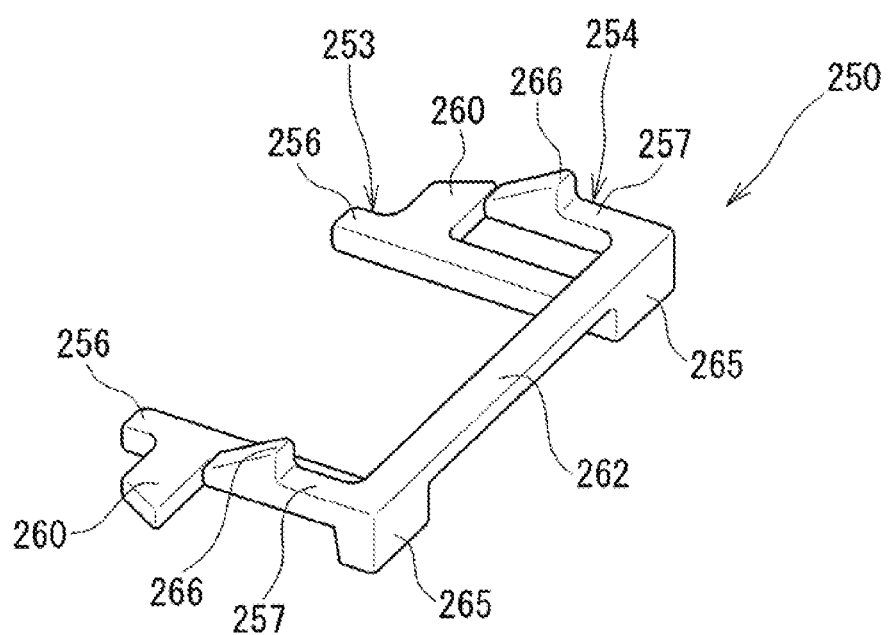
FIG. 7 is a perspective view of a pressing member employed in the electric booster according to the other embodiment.

Next, an electric booster 1A according to another embodiment will be described with reference to FIGS. 6 and 7. The electric booster 1A according to the other embodiment is different from the electric booster 1 according to the embodiment illustrated in FIGS. 1 to 5 in terms of the structure supporting the electronic substrate 188, and therefore will be described focusing only on details of this structure.

In the electric booster 1A according to the other embodiment, a support portion 201A is formed on the linear wall portion 201 of the casing 195. The support portion 201A is provided in a manner protruding to the inner space 195A side. One longitudinal end portion of the electronic substrate 188 is disposed in proximity to the linear wall portion 201 on the support portion 201A of the casing 195. On the other hand, the other longitudinal end portion of the electronic substrate 188 reaches the hollow portion 196C in the protrusion portion 196 provided on the casing 195, and is disposed in proximity to the first casing cover 207.

The one end portion of the electronic substrate 188 is fixed to the casing 195 by a fixation member 245 such as an attachment screw in abutment with the support portion 201A of the casing 195. On the other hand, at the other end portion of the electronic substrate 188, a central portion of the electronic substrate 188 where the Hall IC chip 187 is mounted is disposed at some interval from the front-side wall portion 200 of the casing 195, while an outer peripheral portion of the electronic substrate 188 where the Hall IC chip 187 is not mounted is disposed in abutment with the front-side wall portion 200 of the casing 195. Further, a pressing member 250 is disposed between the other end portion of this electronic substrate 188 and the rear-side wall portion 196A of the protrusion portion 196 of the casing 195 in abutment and engagement with these components 188 and 196A, respectively. Then, the other end portion of the electronic substrate 188 is supported on the protrusion portion 196 of the casing 195 by this pressing member 250.

More specifically, the pressing member 250 is made from a synthetic resin material. This pressing member 250 includes an abutment portion 253 and an engagement portion 254. The abutment portion 253 is in abutment with the surface of the other end portion of the electronic substrate 188 on the opposite side from the Hall IC chip 187 and magnetism detection IC chip 215 side. The engagement portion 254 is formed integrally from this abutment portion 253, and is engaged with the inner wall surface of the rear-side wall portion 196A of the protrusion portion 196. Referring to FIG. 7, the abutment portion 253 is formed by a pair of abutment pieces 256 and 256 rectangular in cross section, which extends along the electronic substrate 188. Support plate portions 260 and 260 are integrally formed on distal end sides of the individual abutment pieces 256, respectively. The support plate portions 260 and 260 are provided in a manner protruding in a direction away from each other. Each of the abutment pieces 256 and each of the support plate portions 260 are equal to each other in thickness.

The engagement portion 254 includes a pair of engagement pieces 257 and 257 rectangular in cross section, and a connection piece 262. The pair of engagement pieces 257 and 257 extends along the inner wall surface of the rear-side wall portion 196A of the protrusion portion 196. The connection piece 262 connects proximal end portions of the pair of engagement pieces 257 and 257 to each other. Each of the engagement pieces 257 and each of the abutment pieces 256 extend in the same direction. Each of the engagement pieces 257 is formed so as to be shorter than each of the abutment pieces 256. A distance between the pair of engagement pieces 257 and 257 is set to a longer distance than a distance between the pair of abutment pieces 256 and 256. The proximal end portion of each of the engagement pieces 257 and the proximal end portion of each of the abutment pieces 256 are integrally connected to each other via each of connection portions 265 and 265. A slight space is formed between each of the engagement pieces 257 and each of the abutment pieces 256. Engagement claw portions 266 and 266 are formed at distal end portions of the pair of engagement pieces 257 and 257. The engagement claw portions 266 and 266 are each provided in a manner protruding toward the rear-side wall portion 196A of the protrusion portion 196.

The pressing member 250 is configured elastically deformably in a direction for causing the pair of engagement pieces 257 and 257 and the pair of abutment pieces 256 and 256 to move toward and away from each other. Then, at the time of assembling, this pressing member 250 is inserted while the distal end of each of the engagement pieces 257 and the distal end of each of the abutment pieces 256 are brought toward each other by causing each of the abutment pieces 256 to abut against the other end portion of the electronic substrate 188 while causing the engagement claw portion 266 of each of the engagement pieces 257 to abut against the inner wall surface of the rear-side wall portion 196A of the protrusion portion 196 from the distal ends of each of the engagement pieces 257 and each of the abutment pieces 256 of the pressing member 250. As a result, the distal end surface of each of the abutment pieces 256 of the pressing member 250 is brought into abutment with the first casing cover 207. This establishes such a state that the engagement claw portion 266 of each of the engagement pieces 257 of the pressing member 250 is engaged with, for example, an engagement recessed portion (not illustrated) provided on the inner wall surface of the rear-side wall portion 196A of the protrusion portion 196, and the pair of abutment pieces 256 and 256 including the support plate portions 260 and 260 is also brought into abutment with the surface of the other end portion of the electronic substrate 188 on the opposite side from the Hall IC chip 187 and the magnetism detection IC chip 215 side.

At this time, the electronic substrate 188 and the rear-side wall portion 196A of the protrusion portion 196 are biased in a direction away from each other due to restoring forces of each of the engagement pieces 257 and each of the abutment pieces 256 of the pressing member 250. As a result, the other end portion of the electronic substrate 188 is supported on the front-side wall portion 200 and the rear-side wall portion 196A of the protrusion portion 196 of the casing 195 by the pressing member 250, which allows the electronic substrate 188 to be supported by the casing 195 on both the longitudinal end portions thereof, thereby being able to prevent or reduce the vibration of the electronic substrate 188. Due to this configuration, the electric booster 1 can prevent or reduce the deterioration of the detection accuracy of the stroke detection device 7 and the rotational angle detection portion 8 and the damage on the electronic substrate 188 due to the vibration of the electronic substrate 188, thereby being able to improve the reliability. The pressing member 250 is made from the synthetic resin material and configured in the above-described form in the above-described embodiment, but is not limited to these material and form as long as the other end portion of the electronic substrate 188 can be supported on the protrusion portion 196 by the pressing member 250.

Then, compared to a configuration that fixes the other end portion of the electronic substrate 188 to the protrusion portion 196 of the casing 195 with use of a fixation member such as an attachment screw, the electric booster 1A according to the other embodiment allows the other end portion of the electronic substrate 188 to be supported on the protrusion portion 196 by the operation of inserting the pressing member 250 by manual work or the like, thereby eliminating the necessity of an attachment tool and the like and also being able to reduce the number of processes for attaching the fixation member, thus being able to improve productivity. In addition, in this embodiment, the pressing member 250 is made from the synthetic resin material, which also leads to a reduction in the weight.

Possible configurations as the electric booster 1 based on the above-described embodiments include the following examples.

According to a first configuration, the electronic booster 1 includes the electric motor 2 configured to thrust the pistons 31 and 32 in the master cylinder 15, the stroke detection device 7 configured to detect the movement amount of the input member 4 connected to the brake pedal 13, the rotational angle detection portion 8 configured to detect the rotational angle of the rotational shaft 2A of the electric motor 2, the control device 9 configured to control the driving of the electric motor 2 based on the results of the detection by the stroke detection device 7 and the rotational angle detection portion 8, and the casing 195 containing the wirings 227 electrically connecting the electric motor 2 and the control device 9 to each other. The stroke detection device 7 includes the first magnets 172A, 172B, and 172C configured to move together with the input member 4 and the first magnetism detection element 187 configured to detect the magnetism from these first magnets 172A, 172B, and 172C. The rotational angle detection portion 8 includes the second magnet 210 configured to move together with the rotational shaft 2A of the electric motor 2 and the second magnetism detection element 215 configured to detect the magnetism from this second magnet 210. The first magnetism detection element 187 and the second magnetism detection element 215 are disposed inside the casing 195.

According to a second configuration, in the first configuration, the first magnetism detection element 187 and the second magnetism detection element 215 are disposed on the single substrate 188 provided in the casing 195.

According to a third configuration, in the second configuration, the substrate 188 is disposed so as to extend from the rotational shaft 2A side where the rotational shaft 2A of the electric motor 2 is located toward the input member 4 side where the input member 4 is located. The first magnetism detection element 187 is disposed on the surface of the substrate 188 on the electric motor 2 side where the electric motor 2 is located.

According to a fourth configuration, in the second or third configuration, the electric motor 2 is fixed to the housing 3 in which the master cylinder 15 is mounted in such a manner that the extension direction of the rotational shaft 2A of the electric motor 2 extends in parallel with the movement direction of the input member 4. The transmission member 229 configured to transmit the rotational output is provided on the one end side of the rotational shaft 2A so as to face the master cylinder 15 side where the master cylinder 15 is located. The substrate 188 is disposed on the other end side of the rotational shaft 2A.

According to a fifth configuration, in the fourth configuration, the flat surface portion of the substrate 188 is disposed so as to face the other end surface of the rotational shaft 2A.

According to a sixth configuration, in the fourth or fifth configuration, the casing 195 is disposed so as to cover the other end side of the rotational shaft 2A of the electric motor 2.

According to a seventh configuration, in any of the first to sixth configurations, the protrusion portion 196 protruding toward the first magnets 172A, 172B, and 172C and including the inner space 195A is formed at the portion of the casing 195 that corresponds to the first magnets 172A, 172B, and 172C. The first magnetism detection element 187 is mounted in the protrusion portion 196.

According to an eighth configuration, in any of the second to seventh configurations, the one end side of the substrate 188 is fixed by the fixation member 245 in abutment with the casing 195. The other end side of the substrate 188 is supported on the casing 195 by the pressing member 250 provided between the substrate 188 and the casing 195 with one of the surfaces thereof out of abutment with the casing 195.

According to a ninth configuration, in the eighth configuration, the other end side of the substrate 188 is inserted in the hollow portion 196C provided on the input member 4 side of the casing 195. The pressing member 250 is provided in the space between the substrate 188 and the casing 195 in the hollow portion 196C.

According to a tenth configuration, in the eighth or ninth configuration, the pressing member 250 biases the substrate 188 and the casing 195 in the direction for separating them away from each other.

According to an eleventh configuration, in any of the eighth to tenth configurations, the pressing member 215 includes the engagement portions 254 engaged with the casing 195, and the abutment portions 253 formed integrally with these engagement portions 254 and placed in abutment with the substrate 188. The engagement portions 254 and the abutment portions 253 are elastically deformable in the direction in which the engagement portion 254 and the abutment portion 253 are in close proximity to each other and in the direction in which the engagement portion 254 and the abutment portion 253 are away from each other.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2017-32142 filed on Feb. 23, 2017 and Japanese Patent Application No. 2017-144847 filed on Jul. 26, 2017. The entire disclosures of Japanese Patent Application No. 2017-32142 filed on Feb. 23, 2017 and Japanese Patent Application No. 2017-144847 filed on Jul. 26, 2017 including the specifications, the claims, the drawings, and the abstracts are incorporated herein by reference in their entirety.

REFERENCE SIGN LIST 1 electric booster
2 electric motor
2A rotational shaft
3 housing
4 input member
7 stroke detection device
8 rotational angle detection portion
9 controller (control device)
10 input rod (input member)
11 input plunger (input member)
13 brake pedal
15 master cylinder
20 front housing
23 rear housing
31 primary piston
32 secondary piston
172A, 172B, 172C magnet member (first magnet)
173 Hall sensor unit
187 Hall IC chip (first magnetism detection element)
188 electronic substrate
195 casing
195A inner space
196 protrusion portion
196C hollow portion
210 magnet member (second magnet)
211 sensor unit
215 magnetism detection IC chip (second magnetism detection element)
224 spacer
227 bus bar (wiring)
229 transmission member
245 fixation member
250 pressing member
253 abutment portion
254 engagement portion

The invention claimed is:

1. An electronic booster comprising:
an electric motor configured to thrust a piston in a master cylinder;
a stroke detection device configured to detect a movement amount of an input member connected to a brake pedal;
a rotational angle detection portion configured to detect a rotational angle of a rotational shaft of the electric motor;
a control device configured to control driving of the electric motor based on results of the detection by the stroke detection device and the rotational angle detection portion; and
a casing that contains a wiring electrically connecting the electric motor and the control device to each other,
wherein the stroke detection device includes a first magnet configured to move together with the input member and a first magnetism detection element configured to detect magnetism from the first magnet,
wherein the first magnet is configured to move parallel to a direction of movement of the input member,
wherein the rotational angle detection portion includes a second magnet configured to move together with the rotational shaft of the electric motor and a second magnetism detection element configured to detect magnetism from the second magnet,
wherein the first magnetism detection element and the second magnetism detection element are disposed inside the casing, and
wherein the first magnetism detection element and the second magnetism detection element are disposed on a single substrate provided in the casing.

2. The electric booster according to claim 1, wherein the substrate is disposed so as to extend from the rotational shaft of the electric motor toward the input member, and
wherein the first magnetism detection element is disposed on an electric motor side of the substrate.

3. The electric booster according to claim 1, further comprising a housing in which the master cylinder is mounted in such a manner that an extension direction of the rotational shaft of the electric motor extends in parallel with a movement direction of the input member,
wherein the electric motor is fixed to the housing,
wherein a transmission member, configured to transmit a rotational output, is provided on one end side of the rotational shaft which is a master cylinder side of the rotational shaft, and
wherein the substrate is disposed on the other end side of the rotational shaft.

4. The electric booster according to claim 3, wherein a flat surface portion of the substrate is disposed so as to face an end surface of the other end side of the rotational shaft.

5. The electric booster according to claim 3, wherein the casing is disposed so as to cover a second end of the rotational shaft of the electric motor.

6. The electric booster according to claim 1, wherein the casing includes a protrusion portion protruding toward the first magnet and including an inner space,
wherein the protrusion portion is formed at a portion of the casing that corresponds to the first magnet, and
wherein the first magnetism detection element is mounted in the protrusion portion.

7. The electric booster according to claim 1, wherein one end side of the substrate is fixed by a fixation member to the casing, and
wherein the other end side of the substrate is supported on the casing by a pressing member provided between the substrate and the casing, and
wherein a surface of the pressing member is out of abutment with the casing.

8. The electric booster according to claim 7, wherein the other end side of the substrate is inserted in a hollow portion provided on an input member side of the casing, and
wherein the pressing member is provided in a space between the substrate and the casing in the hollow portion.

9. The electric booster according to claim 7, wherein the pressing member biases the substrate and the casing in a direction for separating them away from each other.

10. The electric booster according to claim 7, wherein the pressing member includes an engagement portion engaged with the casing, and an abutment portion formed integrally with this engagement portion and placed in abutment with the substrate, and wherein the engagement portion and the abutment portion are elastically deformable in a direction in which the engagement portion and the abutment portion are in close proximity to each other and in a direction in which they are away from each other.

* * * * *